United States Patent [19]

Grenier

[11] Patent Number: 4,460,114
[45] Date of Patent: Jul. 17, 1984

[54] BICYCLE SADDLE BAG

[76] Inventor: Louis Grenier, 134 Laurier, Montreal, Canada

[21] Appl. No.: 466,520

[22] Filed: Feb. 15, 1983

[30] Foreign Application Priority Data

Feb. 24, 1982 [CA] Canada ................................... 396970

[51] Int. Cl.³ .............................................. B62J 9/00
[52] U.S. Cl. ................................ 224/32 R; 224/32 A
[58] Field of Search ................ 224/30 R, 32 R, 32 A, 224/31, 35; D12/126

[56] References Cited

U.S. PATENT DOCUMENTS 4,260,084 4/1981 Warren, Jr. ...................... 224/32 A
4,271,996 6/1981 Montgomery ................... 224/32 A
4,402,439 9/1983 Brown .......................... 224/30 R X

FOREIGN PATENT DOCUMENTS 771886 4/1957 United Kingdom ............. 224/32 R

Primary Examiner—Steven M. Pollard
Attorney, Agent, or Firm—Cushman, Darby & Cushman

[57] ABSTRACT

The disclosure herein describes a bicycle saddle bag which consists of a container body formed of rigid material with an aperture which is covered with a cover made of pliable material; the contour of the latter resiliently engages the rim on the container and a pair of snap fasteners oppositely disposed on the container body allows the cover to partially clear the aperture to provide access to the interior of the container without having to completely remove the cover from the container.

9 Claims, 5 Drawing Figures

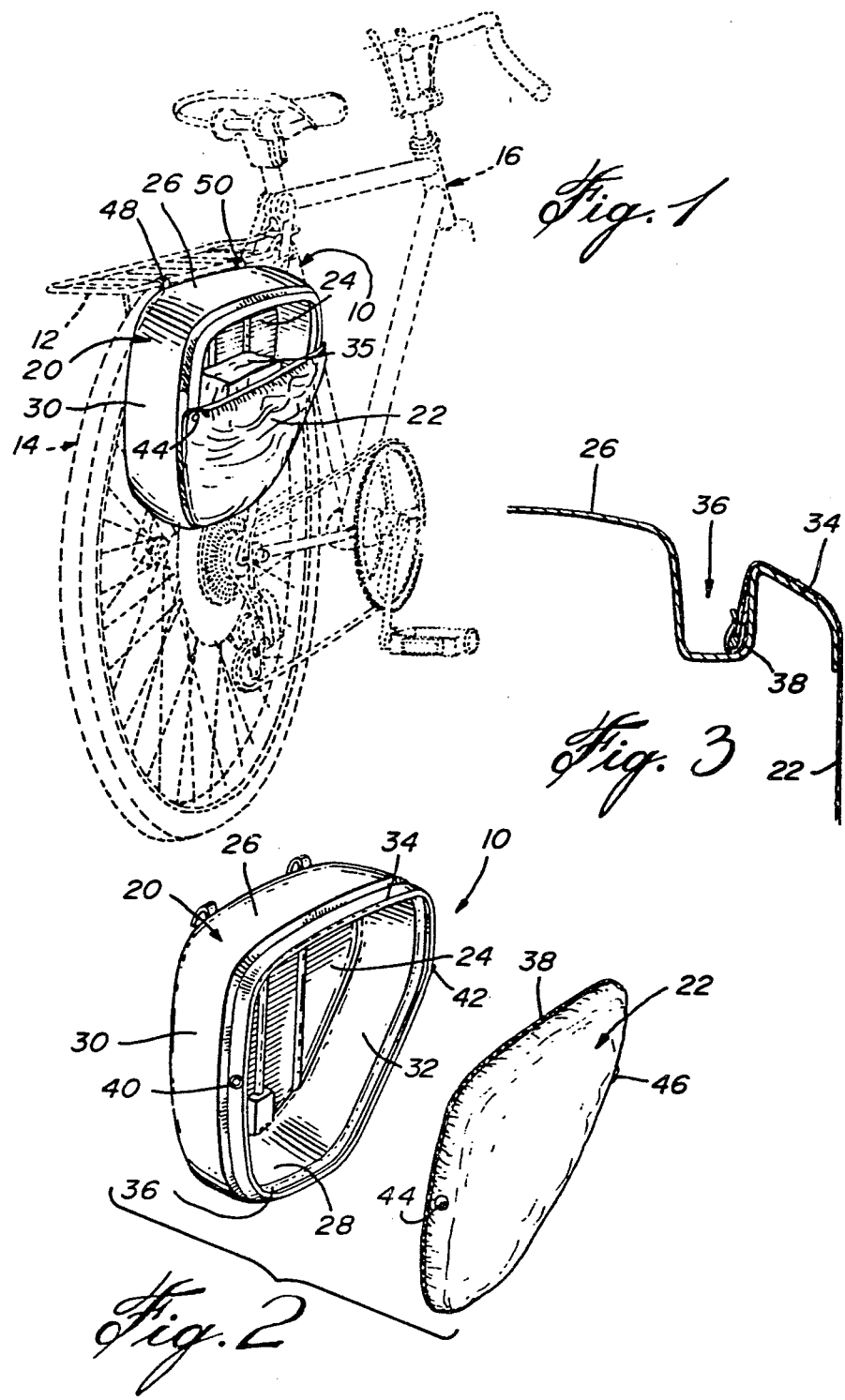

BICYCLE SADDLE BAG

FIELD OF THE INVENTION

The present invention relates to a bag and, more particularly, to a saddle bag which is adapted to be mounted to the side of a bicycle or like cycle.

BACKGROUND OF THE INVENTION

Until now, two generally known types of bags can be found mounted on bicycles. Some are entirely made of flexible or pliable material such as leather, textile, plastic or the like, and they are usually mounted in hanging position to the rear carrier rack of the bicycles. Others are entirely made of rigid material with a rigid base and a rigid cover and usually mounted in sitting position on the carrier rack or on each side thereof.

STATEMENT OF THE INVENTION

The present invention is concerned with providing a saddle bag where the base is formed of a rigid material, while the cover is made of pliable material with provisions, however, to enable the user to partially remove the cover to reach contents inside the container without having to remove entirely the cover from the container.

Preferably, the saddle bag should hang vertically to the side of the rear carrier rack. In this way, the present invention enables the user to reach the contents of the bag without need to unhook the bag from the carrier, which would, otherwise, be the case with rigid bags hanging to one or both sides of the bicycle.

The present invention therefore relates to a bicycle saddle bag which comprises, in its broadest aspect, a container body formed of rigid material; the body having a rim defining an aperture and a recess adjacent the rim; a cover formed of pliable material having a dimension such as to fit over the aperture and a contour such as to be received in the recess, the contour being formed of an extendible material so that the cover may resiliently engage with the container; and attachment means cooperatingly disposed on the cover and the container body so as to allow partial clearing of the cover over the aperture to provide access to the contents in the container without having to completely remove the cover from the container.

Other advantages of the present invention will become apparent from the following description of an embodiment thereof. It should be noted however, that various modifications can be brought to this embodiment without departing from the scope of the appending claims.

BRIEF DESCRIPTION OF THE DRAWINGS

FIG. 1 is a perspective view of saddle bag shown being mounted on a rear carrier rack of a bicycle;

FIG. 2 is an exploded view showing the saddle bag of the present invention;

FIG. 3 is a cross-sectional view showing the engagement of the cover with the container body;

DESCRIPTION OF A PREFERRED EMBODIMENT

Figure 4:
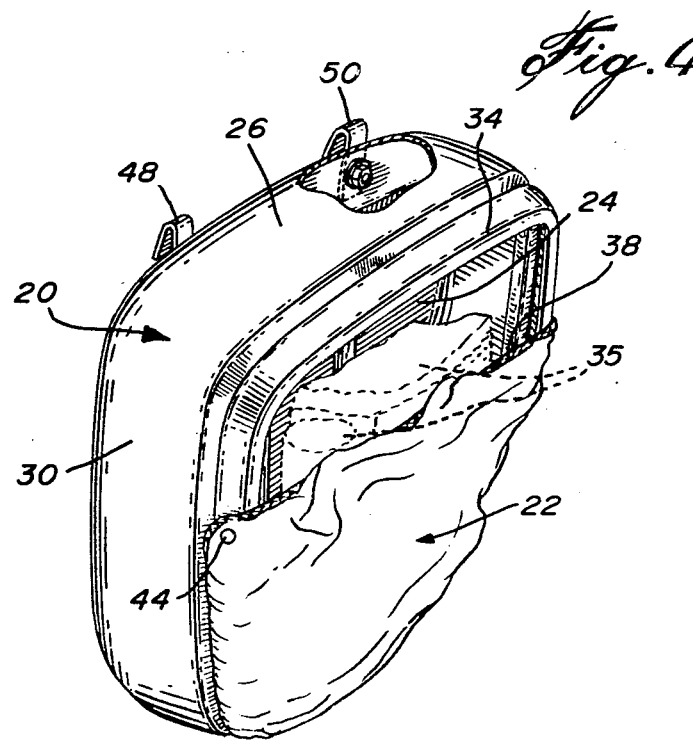
FIG. 4 is a perspective view showing the cover partially removed from the container.

Referring to FIG. 1, there is shown a saddle bag 10 mounted to the rear carrier rack 12 extending over the rear wheel 14 of a bicycle 16.

Referring to FIG. 2, the saddle bag 10 comprises a rigid container body 20 and a flexible cover 22. In the embodiment illustrated, the container body comprises a generally flat bottom 24 and a surrounding side wall that includes a top portion 26, a bottom portion 28, a generally straight vertical side portion 30 and an inclined side portion 32. The container has a rim 34 which has a shape corresponding substantially to the shape of the side wall portions 26, 28, 30 and 32 of the container. Rim 34 defines an opening allowing contents 35 to be received within the container body; the rim is slightly tapered and is followed by a recess 36 extending all around the container body (see FIG. 3). The container is entirely made of rigid material, preferably plastics.

The cover 22 is formed of a pliable material and has a surface area corresponding in shape to that of the opening of the container body and in a size slightly larger than that of the opening so that it may extend beyond the rim 34 into the recess 36. To ensure tight engagement of cover 22 to the container body, the contour edge of the cover is sewn to an elastic band 38.

In accordance with the present invention, some means of attachment of the cover to the container are provided so as to permit a partial uncovering of the cover off the container aperture to permit access to the contents 35. In one form of the invention, these attachment means consist of a pair of fasteners diametrically disposed on the saddle bag. These fasteners may be of the snap type with male portions 40, 42 which are engageable with their respective female portions 44, 46. As can be seen in FIG. 4, the upper part of the cover may be stretched over the rim 34 at the upper part of the container to take the position shown which horizontally across. However, fasteners 40, 42, 44 and 46 prevent the cover from falling off the container. Thus, access to the contents of the container, once mounted on the bicycle rack, is possible without dismounting the container from the rack to set it in a horizontal position and without the risks of having the remaining contents of the container to accidentally fall out.

Figure 5:
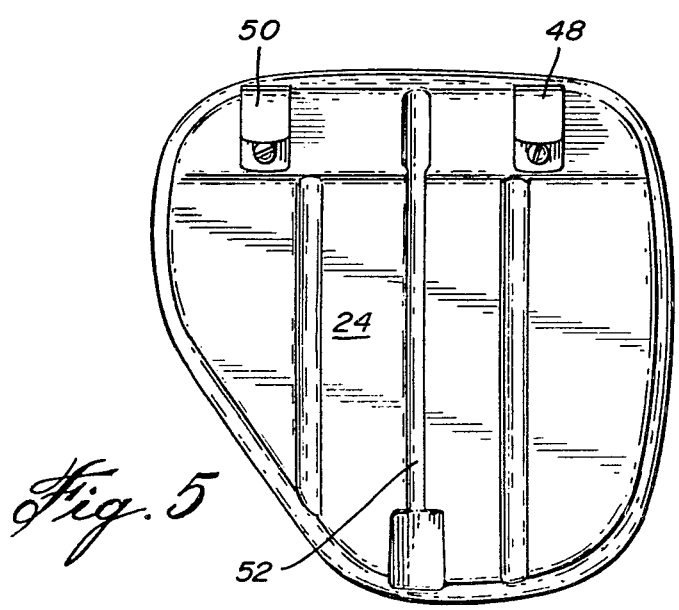
FIG. 5 is an elevational rear view of the saddle bag.

The outer face of the bottom wall 24 is provided with a pair of hooks 48, 50 for mounting the container to the rack 12 of the bicycle. As shown in FIG. 5, the bottom wall also includes a grooved channel 52, which allows the insertion of a supporting device (not shown) for securing the container to the rack.

The pliable material of the cover may include textile fabrics or tissue, such as cloth; one preferred form of a cover made in accordance with the present invention is a layer of a nylon (trademark) material coated with vinyl plastics. The material of the cover should be resistant, preferably water-proof; it may also be transparent.

The embodiments of the invention in which an exclusive property or privilege is claimed are defined as follows:

1. A bicycle saddle bag comprising, in combination:
    a container having a body formed of a rigid material, said body having a rim defining an aperture and a recess formed in said body adjacent said rim;
    a cover formed of pliable material having a dimension such as to fit over said aperture and a contour such as to be received in said recess, said contour being formed of an extendible material so that said cover may fit in resilient engagement with said container; and attachment means cooperatingly disposed on said cover and said container body so as to allow partial clearing of said cover over said aperture to permit access to contents in said container without having to completely remove the cover from the container.

2. A bicycle saddle bag as defined in claim 1, wherein said attachment means are disengageable from one another whereby said cover may be entirely removed from said container.

3. A bicycle saddle bag as defined in claim 2, wherein said attachment means consists of a pair of snap fasteners diametrically disposed on said rim of said container body and on said cover.

4. A bicycle saddle bag as defined in claim 1, wherein said extendible material on the contour of said cover consists of an elastic band secured to said cover.

5. A bicycle saddle bag as defined in claim 1, wherein said container body includes a base; hook means on outer face of said base for attaching said container body to a bicycle support frame.

6. A bicycle saddle bag as defined in claim 5, wherein the outer face of said base includes a grooved channel for receiving therein a supporting rod associated with said support frame.

7. A bicycle saddle bag as defined in claim 1, wherein said rigid material of said container body is rigid plastics.

8. A bicycle saddle bag as defined in claim 1, wherein said pliable material consists of a layer of a nylon material coated with vinyl plastics.

9. A saddle bag for mounting to the side of a bicycle rear carrier rack comprising:
a container having a body formed of a rigid material, said body having a rim defining an aperture and a recess formed in said body adjacent said rim;

means for mounting vertically said container to the side of said rack so that said aperture faces outwardly in a plane substantially parallel to the plane of the bicycle;

a cover formed of pliable material having a dimension such as to fit over said aperture to retain contents in said body, said contour having a contour such as to be received in said recess and being formed of an extendible material so that said cover may fit in resilient engagement with said container; and attachment means cooperatingly disposed on said cover and said container body so as to allow partial clearing of said cover over said aperture to permit access to said contents in said container without having to completely remove the cover from the container, the cover retaining the remaining contents in said body and preventing them from falling out thereof.

* * * * *